Figures 1, 2:
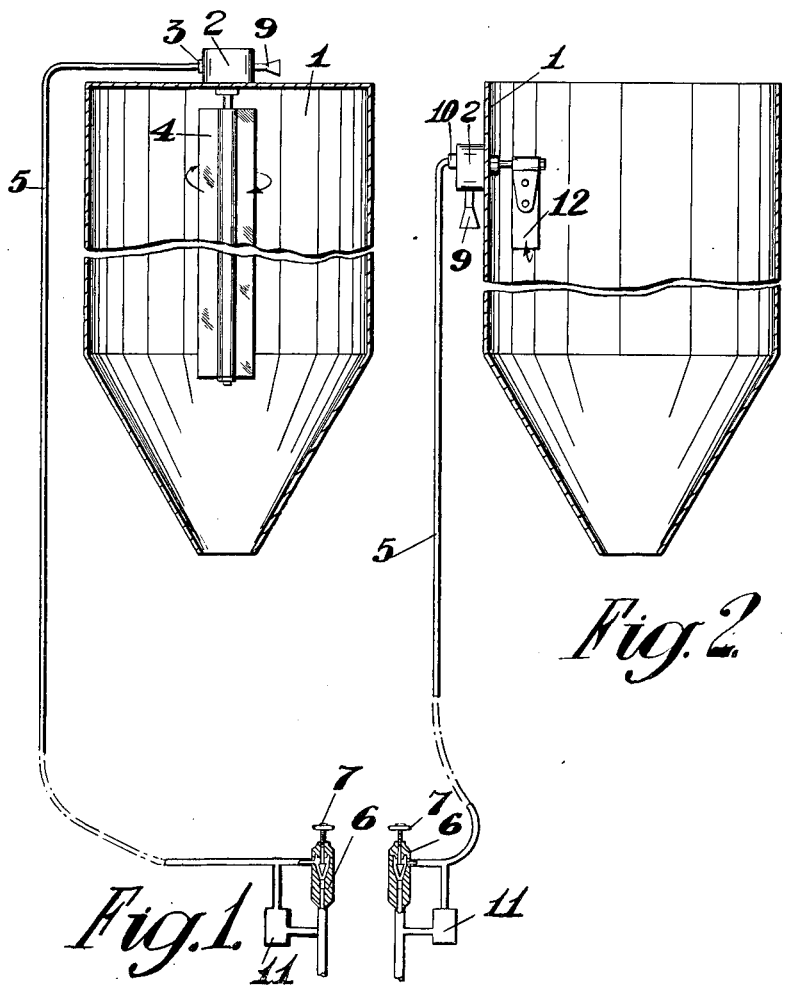

March 21, 1961     R. W. ALLEN     2,975,636
INDICATOR OR CONTROL MECHANISMS USED WITH STORAGE
BINS FOR CEREAL PRODUCTS OR THE LIKE Filed May 16, 1958     2 Sheets-Sheet 1

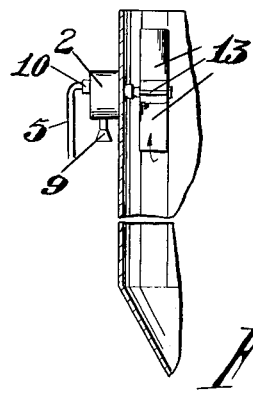
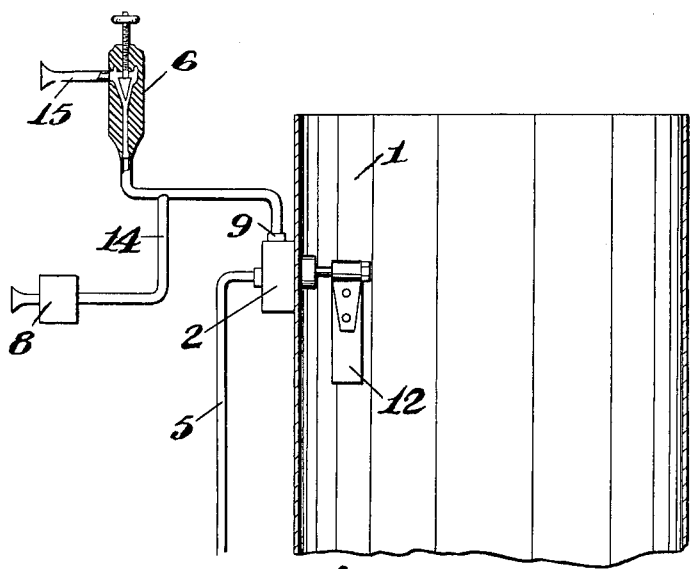

United States Patent Office 2,975,636
Patented Mar. 21, 1961

2,975,636

INDICATOR OR CONTROL MECHANISMS USED WITH STORAGE BINS FOR CEREAL PRODUCTS OR THE LIKE

Robert W. Allen, Hazel Grove, England, assignor to Henry Simon Limited, Stockport, England, a British company Filed May 16, 1958, Ser. No. 735,882

Claims priority, application Great Britain June 12, 1957

12 Claims. (Cl. 73—290)

This invention relates to indicator or control mechanisms for measuring the level of the contents of a storage bin or for indicating or controlling the level in accordance with a predetermined level. The invention is particularly concerned with indicator or control mechanisms suitable for use where storage bin contents comprise cereal products or like materials which, by their cohesive nature, may tend to assume steep and varying angles of repose as for example when air entrained therewith while filling the bin escapes and allows the material level to fall, and which may also tend to arch when material is drawn from an opening in the bottom of the bin, such characteristics of the material being liable to cause faulty operation of indicator or control mechanisms of types which are actuated by the lateral thrust of stored material. Electrically operated devices to overcome these difficulties are known but where there are explosion or fire risks such devices entail the provision of protective devices to mitigate against the possibility of damage to electrical conducting elements which could cause sparking.

The object of this invention is to provide indicator or control means which overcome the difficulties arising from the material characteristics, are positive and reliable in operation, and do not introduce fire or explosion hazards or need added protection because of such hazards.

According to the present invention an indicator or control means which when associated with a storage bin measures the level of the contents of the bin or indicates or controls the level in accordance with a pre-determined level, comprises a positive-displacement fluid-driven motor of a type wherein changes in output torque affect the rate of fluid flow through the motor which operates a paddle and is adapted for mounting at a suitable position in the bin such that the degree of obstruction of the paddle is affected by the level of the contents of the bin, said motor having appropriate ports adapted for connection to a fluid pressure supply and exhaust means, and pressure responsive means which in operation detects a pressure differential in the arrangement resulting from changes in fluid flow rate consequent upon torque output variations arising from alterations in the degree of obstruction of the paddle motion.

Said motor together with a flow restricting device may form a series combination adapted for connection between the fluid pressure source and the atmosphere, the pressure responsive device being connected for detection of a pressure drop across said motor or said flow restricting device.

Referring to the accompanying drawings:

Figure 1 shows diagrammatically one embodiment of the invention for giving a continuous indication of bin level, Figure 2 shows diagrammatically an embodiment of the invention for giving an indication when the bin contents reaches a predetermined level, Figure 3 shows an alternative paddle arrangement for the embodiment shown in Figure 2, and Figure 4 shows diagrammatically another embodiment for giving an indication and initiating a control operation when the bin contents reaches a predetermined level.

In Figure 1 there is shown in section a storage bin 1 having mounted on the top thereof an air-driven positive-displacement motor 2 having a rotatable shaft 3 on which is secured a paddle 4 extending axially of the bin for the greater part of the height of the bin. An inlet port 10 of the motor 2 is connected via a pipe line 5 incorporating an air flow restricting device 6 to a source of compressed air. The device 6 is adjustable by means of a control 7. A pressure sensitive indicator and/or control element 11 is connected across the air flow restricting device 6 and detects the difference in pressure across the said restricting device. The motor 2 exhausts to atmosphere at outlet port 9.

In operation, when the path of motion of the paddle 4 is unobstructed the air pressure at the motor inlet, i.e. in pipe line 5, will be only such as is required to overcome friction and windage losses, but when the bin content level is raised and the free motion of the paddle 4 is gradually obstructed, the torque required to rotate the paddle will correspondingly increase and this will be reflected in a rise in pressure in pipe line 5, which may even increase to the pressure of the compressed air source in which case the motor 2 will have stalled. The pressure sensitive element 11, which may be a pressure gauge calibrated in units of bin contents or a control element for effecting continuous control, detects the difference between the pressure in pipe line 5 and the compressed air source, i.e. the pressure across the air flow restricting device 6, which pressure difference is a maximum when the paddle is unobstructed and a minimum when the paddle is obstructed corresponding to a full bin or when failure of the compressed air source occurs. Thus this arrangement has what is known as the feature of "fail to safe," in that an indication will be given that the bin is not in a condition to receive additional material.

By adjustment of the air flow restricting device 7 the speed of the motor 2 can be adjusted to a suitable slow speed of rotation which might for example be 2 r.p.m. such slow speed operation minimising both air consumption and wear but increasing the response time of the element 11, so that the restriction setting for any particular application represents a compromise according to the relative importance of these factors.

Preferably the air flow restricting device 7, the pressure-sensitive element 11, and the source of compressed air are located together at a position remote from the storage bin 1 and other potentially hazardous locations, the source of compressed air being arranged where desired to serve a plurality of such installations in parallel.

Figure 2 shows another paddle arrangement in which the motor 2 is arranged to oscillate a single bladed paddle 12 through a small angle for effecting an indicating or controlling operation when the contents of the bin 1 reaches a predetermined level, which is determined by mounting the paddle in the bin at or about the desired predetermined level.

Figure 3 shows an alternative arrangement in which a multi-bladed rotating paddle 13 is provided for effecting an indicating or controlling operation when the bin contents reaches a predetermined level.

Figure 4 shows an arrangement in which the "fail-to-safe" feature is attained with a pressure-sensitive element which is of a less complex type, than such as is used in Figure 1. The compressed air source is connected by pipe line 5 directly to the motor 2 which is arranged to oscillate the paddle 12. The outlet port 9 of the motor 2 instead of opening to atmosphere is connected by pipes 14 to a restricting device 6 and a pressure sensitive element 8. The outlet 15 of device 6 exhausts to atmosphere and the element 8 detects the difference in pressure between the outlet port 9 of the motor 2 and atmosphere. When the bin is full and the paddle 12 is obstructed the pressure difference between the motor outlet port 9 and atmosphere is a minimum, which is the case when there is a failure of the source of compressed air. Thus the desirable "fail-to-safe" feature is provided with a simple form of pressure-sensitive element.

Any of the various forms of paddle arrangements shown may be used in combination with any of the arrangements of restricting devices and pressure sensitive elements shown. Where such a pressure-sensitive element is required to initiate a control operation related to the contents level of an associated bin, it is caused to actuate an air valve or electrical switch of known kind which is arranged to operate the means whereby the contents level of the bin can be changed. The dotted line in Fig. 4 shows such an arrangement where pressure-sensitive element 8 causes the actuation of an air-valve in the pressure line to a pneumatic drive means which opens a material inlet slide when the paddle 12 is unobstructed.

I claim:

1. An indicator means for indicating the contents level of a storage bin, comprising a positive-displacement fluid-driven motor, having an output shaft, a paddle carried by said output shaft and adapted to be obstructed to varying degree by the bin contents, a flow restricting device, said motor and said flow restricting device forming a series combination between a fluid pressure source and atmosphere, and a pressure responsive device connected effectively across said flow restricting device, said pressure responsive device indicating the contents level of said bin.

2. An indicator means as claimed in claim 1 wherein said paddle means is axially elongated and is arranged to extend vertically in the bin to enable a continuous level indication.

3. An indicator means as claimed in claim 1 wherein said paddle means is small and is mounted with said motor at about a predetermined level at which it is desired to effect an indicating operation.

4. An indicator means for indicating the contents level of a storage bin, comprising a source of fluid pressure, a flow restricting device connected by pipe means to said source, a positive-displacement fluid-driven motor having an inlet port connected by a second pipe means to said flow restricting device and an outlet port open to atmosphere, said motor having an output shaft carrying paddle means adapted to be obstructed to varying degree by the bin contents, and a pressure responsive device connected across said flow restricting device for indicating the contents level of said bin.

5. An indicator means for indicating the contents level of a storage bin, comprising a source of fluid pressure, a positive-displacement fluid-driven motor having an inlet port connected by pipe means to said source, a flow restricting device connected by a second pipe means to an outlet port of said motor and also exhausting to atmosphere, said motor having an output shaft carrying paddle means adapted to be obstructed to varying degree by the bin contents, and a pressure responsive device connected between said second pipe means and atmosphere, said pressure responsive device indicating the contents level of said bin.

6. An indicator means for indicating the contents level of a storage bin, comprising a positive-displacement fluid-driven motor, having an output shaft, a paddle carried by said output shaft and adapted to be obstructed to varying degree by the bin contents, an adjustable flow restricting device, said motor and said flow restricting device forming a series combination for connection between a fluid pressure source and atmosphere, and a pressure responsive device connected effectively across said flow restricting device, said pressure responsive device indicating the contents level of said bin.

7. In a means for controlling the contents level of a storage bin, a positive-displacement fluid-driven motor, having an output shaft, a paddle carried by said output shaft and adapted to be obstructed to varying degree by the bin contents, a flow restricting device, said motor and said flow restricting device forming a series combination for connection between a fluid pressure source and atmosphere, and a pressure responsive control element connected effectively across said flow restricting device, whereby the flow to the bin may be controlled to control the contents level of said bin.

8. In the means as claimed in claim 7, said paddle means being axially elongated and arranged to extend vertically in the bin to enable continuous control element operation.

9. In the means as claimed in claim 7, said paddle means being small and mounted with said motor at a predetermined level at which it is desired to effect a control operation.

10. In a means for controlling the contents level of a storage bin, a source of fluid pressure, a flow restricting device connected by pipe means to said source, a positive-displacement fluid-driven motor having an inlet port connected by a second pipe means to said flow restricting device and an outlet port open to atmosphere, said motor having an output shaft carrying paddle means adapted to be obstructed to varying degree by the bin contents, and a pressure responsive control element connected across said flow restricting device whereby the flow to and from the bin may be controlled.

11. In a means for controlling the contents level of a storage bin, a source of fluid pressure, a positive-displacement fluid-driven motor having an inlet port connected by pipe means to said source, a flow restricting device connected by a second pipe means to an outlet port of said motor and also exhausting to atmosphere, said motor having an output shaft carrying paddle means adapted to be obstructed to varying degree by the bin contents, and a pressure responsive control element connected between said second pipe means and atmosphere whereby the contents level of said bin may be controlled.

12. In a means for controlling the contents level of a storage bin, a positive-displacement fluid-driven motor, having an output shaft, a paddle carried by said output shaft and adapted to be obstructed to varying degree by the bin contents, and adjustable flow restricting device, said motor and said flow restricting device forming a series combination for connection between a fluid pressure source and atmosphere, and a pressure responsive control element connected effectively across said flow restricting device, said pressure responsive control element being the flow to and from the bin to control the contents level of said bin.

References Cited in the file of this patent

UNITED STATES PATENTS

| 2,643,542 | Cronk | June 30, 1953 |

FOREIGN PATENTS

| 376,215 | Germany | May 28, 1923 |
| 513,395 | Canada | May 31, 1955 |